United States Patent [19]

Cheng

[11] Patent Number: 4,490,346
[45] Date of Patent: Dec. 25, 1984

[54] METHOD FOR PRODUCING CARBON BLACK

[75] Inventor: Paul J. Cheng, Bartlesville, Okla.

[73] Assignee: Phillips Petroleum Company, Bartlesville, Okla.

[21] Appl. No.: 397,318

[22] Filed: Jul. 12, 1982

[51] Int. Cl.³ .................. C01B 31/02; C09C 1/48
[52] U.S. Cl. .................. 423/456; 423/450; 423/457; 422/150
[58] Field of Search ............. 423/445, 449, 450, 455, 423/456, 457; 422/150

[56] References Cited

U.S. PATENT DOCUMENTS

| | | | |
|---|---|---|---|
| 2,641,534 | 6/1953 | Krejci | 23/209.4 |
| 2,782,101 | 2/1957 | Heller | 423/457 |
| 2,864,673 | 12/1958 | Nannini | 422/150 |
| 2,918,353 | 12/1959 | Heller | 23/209.4 |
| 2,985,511 | 5/1961 | Norris, Jr. et al. | 23/209.4 |
| 3,211,532 | 10/1965 | Henderson | 23/259.5 |
| 3,235,334 | 2/1960 | Kelmers | 23/209.4 |
| 3,301,639 | 1/1967 | De Land | 23/209.4 |
| 3,431,075 | 3/1969 | Gunnell | 23/209.4 |
| 4,134,966 | 1/1979 | Austin | 423/456 |

Primary Examiner—Gregory A. Heller

[57] ABSTRACT

In the production of carbon black, low BTU content gases are combusted in a compact combustion zone with near stoichiometric amounts of oxidant gases, tempered to the desired temperature and volume with a diluent gas stream which can be selected from air and filter off-gases, and introduced into a reactor for the pyrolysis of a carbonceous feedstock to form carbon black.

8 Claims, 4 Drawing Figures

METHOD FOR PRODUCING CARBON BLACK

The present invention relates to method and apparatus for producing carbon black. In another aspect the invention relates to a method for regulating the temperature of combustion gases introduced into the precombustion zone of a carbon black reactor by introducing a quench fluid into the precombustion zone. In another aspect the invention relates to combusting low-energy content fuel to provide combustion gases suitable for pyrolyzing a carbonaceous feed stock to form carbon black.

One of the problems encountered in the operation of carbon black reactors is the control of the temperature of the hot combustion gases used to pyrolyze the make hydrocarbon feedstock. The hot combustion gases can either be formed in a combustion zone within the reactor or in an external combustion zone and then introduced into the reactor. It is desirable to have the hot combustion gases at a temperature sufficiently high to effect efficient pyrolysis of the make hydrocarbon and produce carbon black while not having the temperature of the combustion gases excessively high, which could cause damage to the refractory lining of the combustion zone and/or reaction zone.

Another problem encountered in producing carbon black by pyrolysis of the make hydrocarbon is that of control of the combustion of a combustible fuel with an oxygen-containing gas, such as air. Combustion should be conducted such that there is moderate to low oxygen left when the combustion gases contact the make hydrocarbon. If too much excess oxygen is provided for combustion then the excess oxygen will oxidize a portion of the make hydrocarbon and thereby reduce the yield of carbon black from the make oil. Since make hydrocarbons usually have a higher price than the combustible fuel, it is highly desirable to have the combustible fuel supply most of the required pyrolysis heat.

In a carbon black plant, off-gas from the reactor filter system almost always contains combustible materials in minor quantities. It would be highly desirable and economical to exploit the BTU value of the off-gas to provide the heat for the pyrolysis of the carbon black feedstock. Problems encountered in producing carbon black by the combustion of combustible portions of the off-gas recovered from the filters include control of temperature, oxygen content, and flow rate of the combustion gases.

OBJECTS OF THE INVENTION

An object of this invention is to provide a compact apparatus for combusting low BTU content gases to provide combustion gases for the pyrolysis of a carbonaceous feedstock to form carbon black.

Another object of the invention is to provide an apparatus for producing carbon black which uses off-gas separated from carbon black as fuel for forming the hot combustion gases.

Another object of the invention is to provide a method for producing carbon black in which minimal excess oxygen is introduced into the reaction zone.

STATEMENT OF THE INVENTION

According to certain aspects of the present invention, there is provided a process for producing carbon black in which a low BTU content fuel gas stream is combusted with an oxidant gas stream to provide a combustion product stream which is in turn tempered with a diluent gas stream to provide a tempered combustion product stream having a temperature sufficiently high to decompose a hydrocarbon feedstock to form carbon black, injecting a hydrocarbon feedstock into the tempered combustion product stream to form carbon black, and collecting the carbon black thus produced. The fuel gas stream desirably comprises off-gases as from the filter system of a carbon black plant in which instance it will contain at least five percent by volume of at least one of carbon monoxide and molecular hydrogen. When this stream is combusted with a stoichiometric amount of air the refractory limits of the reactor will not be exceeded, yet the combustion reaction will proceed at a satisfactorily high rate so that the required volume of combustion gases can be formed in a compact apparatus. The diluent gas stream is desirably selected from air and off-gas from the plant filter system. Where air is used as the diluent, partial combustion of the hydrocarbon feedstock by the air will provide additional heat for the pyrolysis reaction. Where filter off-gases are used as the diluent stream high conversion of hydrocarbon to blacks can be obtained since combustion of the hydrocarbon feedstock will not occur.

In other aspects, an apparatus is provided which comprises a mass of refractory defining a first generally cylindrical precombustion zone having an upstream end and downstream end and a generally cylindrical side wall connecting the upstream end with the downstream end, a first end wall which defines the upstream end of the first precombustion zone, a first generally cylindrical combustion zone having a diameter less than that of the first precombustion zone connected to and in axial alignment with the downstream end of the first precombustion zone, a first tunnel opening through the generally cylindrical side wall of the first precombustion zone in a generally tangential direction, a second tunnel opening through the generally cylindrical side wall of the first precombustion zone in a generally tangential direction and corotationally with the first tunnel, a generally cylindrical second combustion zone in axial alignment with and connected to the second tunnel, said generally cylindrical second combustion zone having an upstream end defined by a second end wall, and a downstream end; a gas compressor; and a conduit means establishing a first flow path between the gas compressor and the second combustion zone and a second flow path between the gas compressor and the first tunnel. A compact apparatus well suited for the production of carbon black utilizing filter off-gases as fuel to form the combustion gases is thus provided.

DETAILED DESCRIPTION OF THE INVENTION

Figure 4:
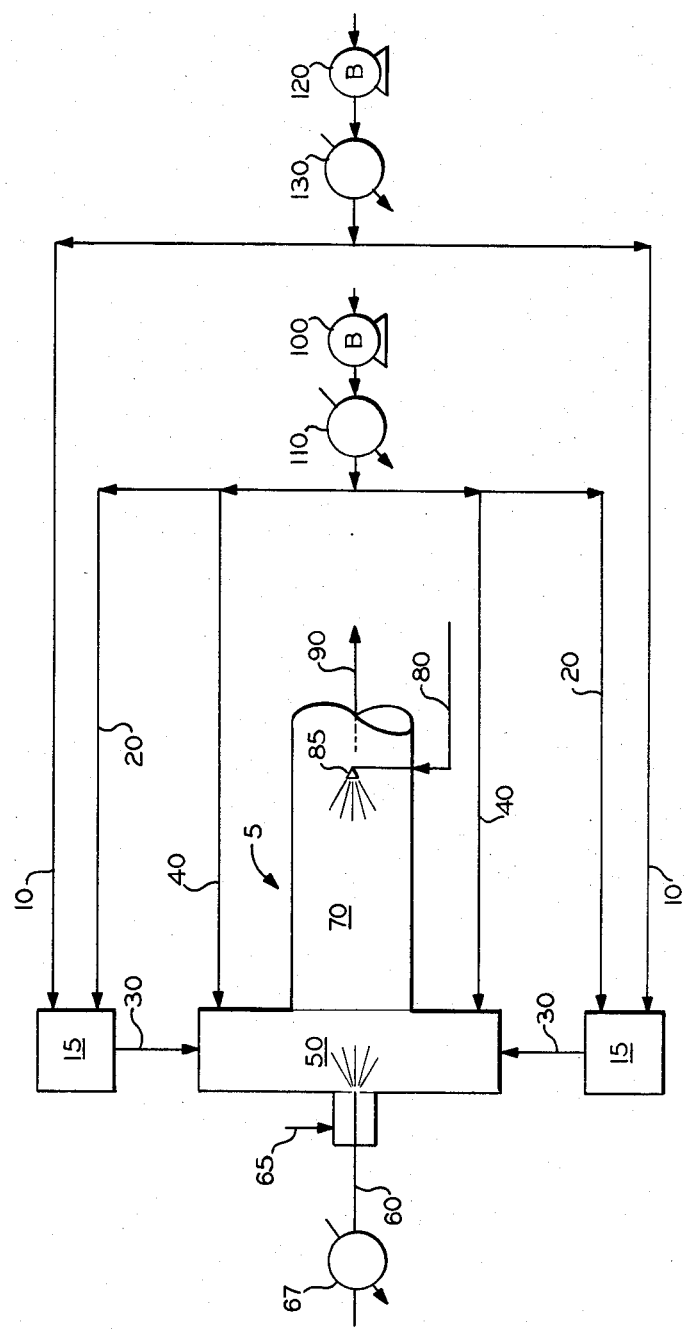
FIG. 4 schematically illustrates certain features according to one embodiment of the present invention.

With reference to FIG. 4, an apparatus comprises a reactor designated generally by the numeral 5 having a precombustion zone 50 and a reaction zone 70. At least one external combustion zone 15 is connected to the precombustion zone 50 by a tunnel 30. At least one diluent gas is provided through the tunnel 40 which also opens into the precombustion zone 50.

Combustion gases are introduced into the precombustion zone 50 through the tunnel 30. Diluent gases are introduced into the precombustion zone 50 through the tunnel 40. A carbonaceous feedstock is introduced into the precombustion zone 50 through a conduit 60 for pyrolysis with the combustion gases introduced through the tunnel 30. Usually, a small amount of cooling gas 65 is introduced into the precombustion zone 50 annularly to the conduit 60 to prevent the conduit 60 which is usually provided with a nozzle at its discharge end from being exposed to excessively high temperatures. It is also desirable to heat the contents of conduit 60 by passage of the conduit 60 into heat exchange relationship with a heater 67.

The pyrolysis reaction which initiates in the zone 50 is quenched in the zone 70 by the introduction into the zone 70 of a suitable quench fluid carried by conduit 80. Usually, the fluid carried by the conduit 80 is introduced into the zone 70 through one or more nozzles 85. Preferably, the fluid carried by the conduit 80 is water although other suitable quenching fluids such as cool gases can be used if desired. Effluent from the carbon black reactor 5 is withdrawn from the zone 70 by conduit 90 and routed for further processing such as collecting the carbon black produced in the apparatus by cyclones, bag filters, and the like.

According to certain aspects of the present invention, a gas compressor 100 is connected to the precombustion zone 50 by the conduit 40 and to the external combustion zone 15 by a conduit 20. A heater 110 is preferably positioned in association with the fluid flow path between the blower 100 and the zones 50 and 15. A gas compressor 120 is connected to the combustion zone 15 by a conduit 10. A heater 130 is preferably associated with the fluid flow path 10 between the blower 120 and the combustion zone 15. One of the blowers 100 and 120 is preferably connected to a source of oxidant gas, such as the atmosphere, and the other is preferably connected to a source of low BTU gas, such as the off-gases from a filter in a carbon black plant. Preferably, the off-gases will be recovered from the manufacture of a "soft" carbon black, such as a black in the ASTM N500-N900 series, because such off-gases generally have a higher BTU content than off-gases from the manufacture of a "hard" black, such as ASTM N100-N300 series. For the purposes of further discussion the embodiment of the invention where blower 120 is connected to the filters of a carbon black plant and blower 100 draws from the atmosphere will be described, although this embodiment is for the purposes of illustration and the invention is not to be construed as limited thereto.

Figure 1:
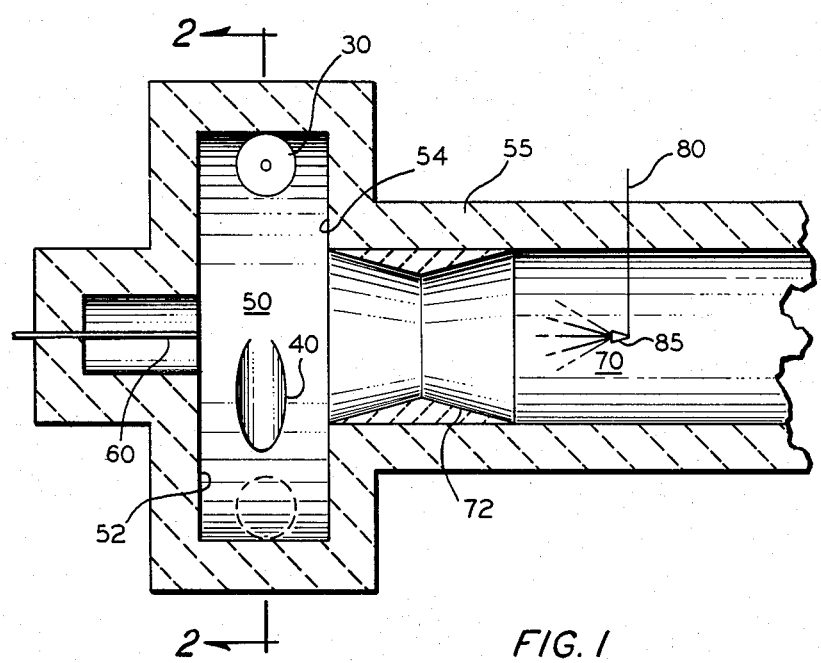
FIG. 1 schematically illustrates in side-sectional view a carbon black reactor embodying certain features of the present invention.
Figure 3:
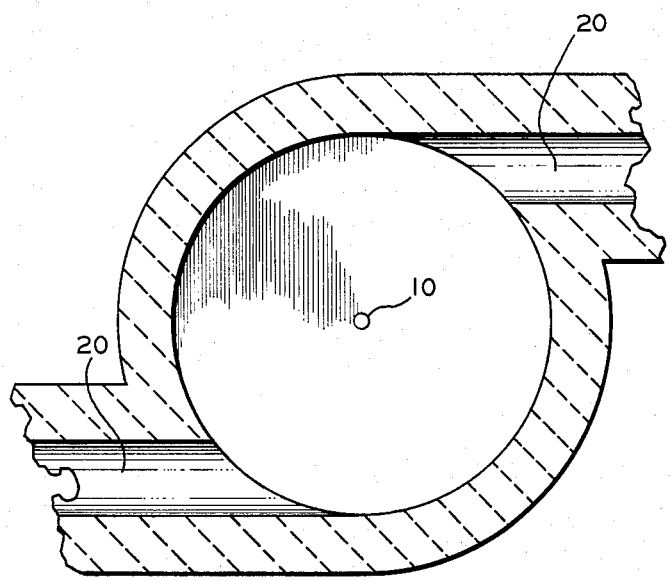
FIG. 3 illustrates in side-sectional view certain features of the apparatus of FIG. 2 taken along the indicated lines.
Figure 2:
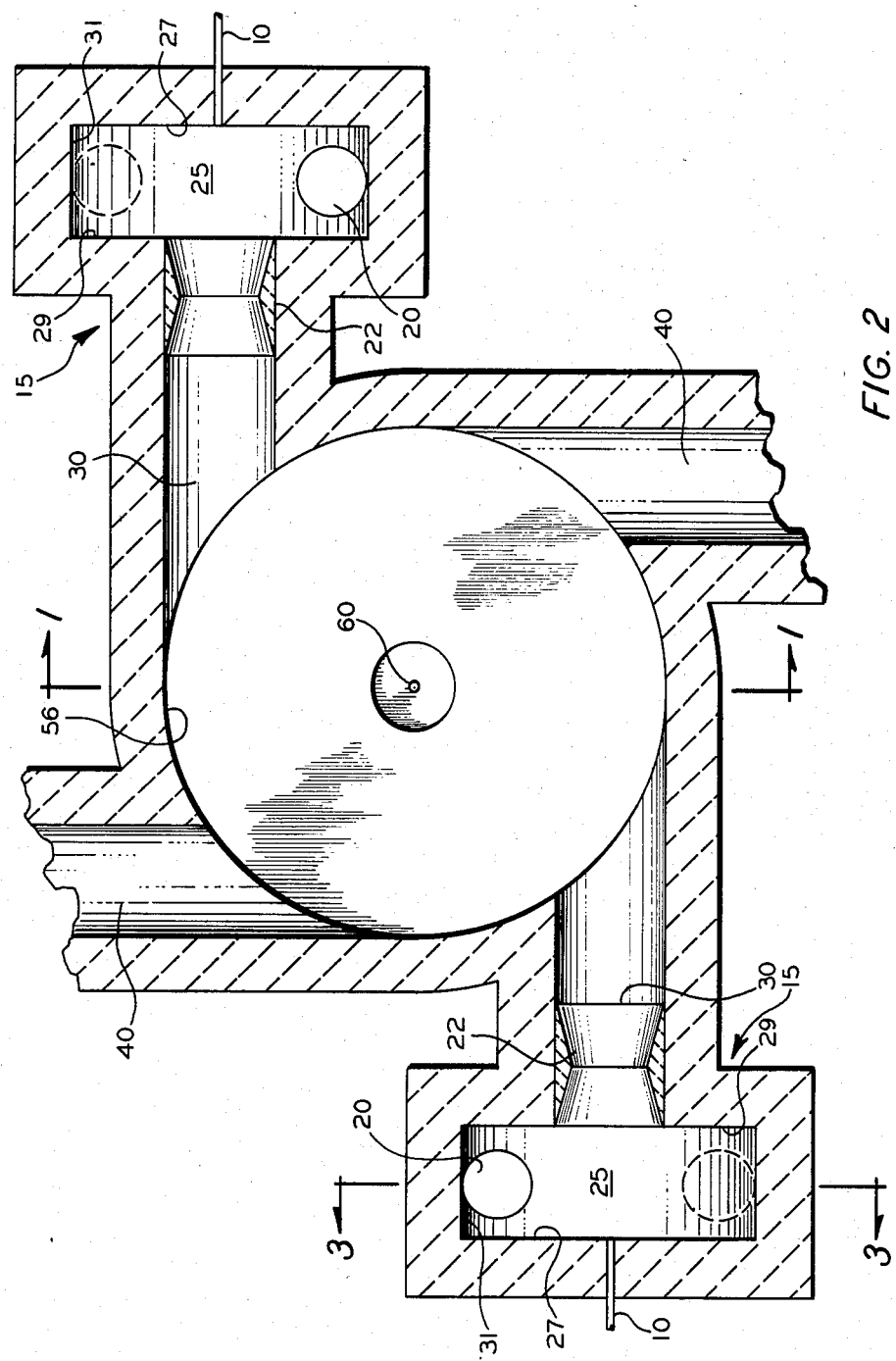
FIG. 2 represents a cross-sectional view of the apparatus of FIG. 1 taken along the indicated lines.

Referring now to FIGS. 1-3, a preferred apparatus according to the present invention comprises a mass of refractory 55 defining a first generally cylindrical precombustion zone 50 in which pyrolysis of carbonaceous feedstock introduced by conduit 60 is initiated. The zone 50 has an upstream end defined by upstream end wall 52, a downstream end defined by a generally annular downstream wall 54 and a generally cylindrical side wall 56 connecting the upstream end 52 with the downstream end 54. A first generally cylindrical reaction zone 70 having a diameter less than that of the first precombustion zone 50 is connected to and in axial alignment with the downstream end of the first precombustion zone 50. A venturi 72 can optionally be positioned in the reaction zone 70 adjacent the precombustion zone 50 if desired. A first tunnel 40 opens into the first precombustion zone 50 through the generally cylindrical side wall 56 defining the precombustion zone 50 preferably in a generally tangential direction. In the preferred embodiment, the tunnel 40 is connected via suitable conduit means to the blower 100 shown in FIG. 4. A second tunnel 30 opens through the generally cylindrical side wall 56 of the first precombustion zone 50 preferably in a generally tangential direction for corotational discharge with the first tunnel 40. The tunnel 30 connects the precombustion zone 50 to the external combustion zone 15.

Preferably, the external combustion zone 15 is defined by refractory defining a generally cylindrical second combustion zone 25 in axial alignment with and connected to the second tunnel 30. The second generally cylindrical combustion zone 25 has an upstream end defined by an upstream end wall 27 and a downstream end defined by a generally annular downstream end wall 29 and a generally cylindrical side wall 31 connecting the upstream wall 27 to the downstream wall 29. The conduit 20 preferably empties into the combustion zone 25 through the generally cylindrical side wall 31, preferably in a generally tangential direction. The conduit 10 preferably empties into the generally cylindrical combustion zone 25 in an axial direction with respect to the longitudinal axis of the zone 25. If desired, an optional venturi 22 can be positioned at the upstream end of each tunnel 30 adjacent to the external combustion zones 15. It is to be understood that where filter off-gases are employed as both diluent and fuel, with reference to FIG. 4 blower 120 would be connected to the atmosphere and blower 100 would draw from filters of a carbon black plant.

The apparatus shown by the Figures can be utilized by a process comprising combusting a fuel gas stream with an oxidant gas stream of molecular oxygen-containing gas to provide a combustion product stream. The fuel gas stream is preferably a so-called low BTU content fuel gas such as would be recovered from the filters in a carbon black plant. By low BTU content is meant a BTU value of up to about 120 BTU/SCF. Generally, the fuel gas stream will comprise at least five percent by volume of at least one of molecular hydrogen and carbon monoxide, and will usually contain both at a combined concentration of 20-50% by volume. The BTU content range of an off-gas stream recovered from the carbon black plant filters will typically range from 40 to 120 BTU/SCF and more usually between about 60 and 100 BTU/SCF. The oxidant stream of molecular oxygen-containing gas is generally air, although oxygen enriched or pure oxygen-containing streams can also be advantageously utilized.

Preferably, combustion in the external combustion zone 15 is conducted at near stoichiometric conditions. By near stoichiometric is meant that the amount of oxidant which is combined with the fuel gas stream is within about 20 percent of the amount required to completely combust the combustible components in the fuel gas stream. Four factors are important to observe during the combustion which occurs in the zone 15. Flame temperature, gas BTU content, gas and oxidant concentrations and aerodynamics, particularly turbulence and recirculation greatly influence reaction kinetics. Of these four factors, flame temperature is probably the most important. The higher the flame temperature, the faster the combustion and the smaller the burner size required. The highest flame temperature for a given fuel gas occurs when the combustion is taking place at or near the stoichiometric condition. In conventional processes using high BTU gas, such as natural gas, or other gases having a BTU content in excess of about 900 BTU/SCF, operation at stoichiometric conditions in the external combustors is not practical, because the flame temperature exceeds the refractory capabilities. The flame temperature generated when low BTU gases are combusted is well below the refractory temperature limits. In fact, it is further desirable to provide heated fuel gas and oxidant gas to the external combustion zone 15 so that flame temperature can closely approach the refractory limits and the size of the external zone 15 can be decreased so as to provide a very compact apparatus. Generally, the temperature of the oxidant gas and fuel gas are manipulated so that the combustion product stream carried by tunnel 30 will have a temperature in the range of 2500°–3400° F. Usually, in order to produce combustion gases within this temperature range, each of the fuel gas and oxidant gas must be heated to a temperature within the range of 400°–1200° F.

The combustion product stream is combined with the diluent gas stream preferably in the zone 50 to provide a tempered combustion product stream having a temperature sufficiently high to decompose a hydrocarbon feedstock and form carbon black, although the streams can be combined between the zones 25 and 50 if desired. Generally, the tempered combustion product stream will be at a temperature of between about 2300° F. and 3100° F. In order to reduce the temperature of the combustion product stream and increase the volume of the gases entering the zone 70, each standard part by volume of the combustion product stream is combined with at least 0.1 standard parts by volume of the diluent gas stream. Generally, from 0.2 about 0.8, usually from about 0.3 to about 0.7, standard parts by volume of diluent are combined with each part by volume of combustion gases. As previously discussed, the diluent gas stream can be selected from filter off-gases and air, for example, and can also be at higher than ambient temperature, if desired. A carbonaceous feedstock is injected into the tempered combustion product stream via the conduit 60 to form carbon black and the carbon black thus produced is collected as is well known to those of ordinary skill, preferably after quenching at nozzle 85.

The invention is illustrated by the following calculated example.

CALCULATED EXAMPLE

Low heating value combustible gas, such as an off-gas from the filter of a carbon black operation, is burned in a first zone using an oxidant such as air (20) at about stoichiometric conditions. The fuel gas (10) is charged axially, longitudinally into the blast tube with the air (20) being charged tangentially to the blast tube using an enlarged tangential zone. The resulting hot combustion gas flows via a venturi (22) and tube (30) entering tangentially into the combustion or precombustion zone (50) of the carbon black reactor. Preferably two similar tangential blast tubes are used, positioned 180 degrees apart around the precombustion zone (50).

Diluent, such as air (40) is charged tangentially to precombustion zone (50). Preferably two tangential diluent gas inlets are used, positioned 180 degrees apart around the precombustion zone (50). These diluent gas inlets are at about 90 degrees from the hot combustion gas (30) tunnels or blast tubes.

Feedstock (60), a carbonaceous material such as a hydrocarbon, is charged axially (along the longitudinal axis) of the precombustion zone (50). Carbon black-containing gas (smoke) enters the reaction zone 70, is quenched to below carbon black forming conditions, cooled, and ultimately carbon black is recovered from the gas as by bag filtration (not shown).

Table I sets forth a set of calculated process parameters.

TABLE I

| (10) Off-Gas From "Soft" N550 Carbon Black Reactor (Total): | |
|---|---|
| SCF/hour, | 81,100 |
| Pressure, psia., | 20 |
| Temperature, °F., | 1200 |
| Composition, vol. % | |
| $H_2$ | 12.7 |
| CO | 11.54 |
| $CO_2$ | 6.48 |
| $N_2$ + Ar | 60.48 |
| $H_2O$ | 8.29 |
| Hydrocarbon ($C_2H_2$ + $CH_4$) | 0.51 |
| Btu/SCF, | 77.1 |
| (20) Stoichiometric Air for Off-Gas (10) Total: | |
| SCF/hour, | 51,300 |
| Pressure, psia, | 23 |
| Temperature, °F. | 1200 |
| (30) Hot Combustion Gases (Total): | |
| SCF/hour, | 122,500 |
| Pressure, psia., | 20 |
| Temperature, °F., | 3300 |
| (40) Diluent Air (Total): | |
| SCF/hour, | 82,000 |
| Pressure, psia., | 20 |
| Temperature, °F., | 1200 |
| (50) Blend of (30's) and (40's) Total: | |
| SCF/hour, | 204,500 |
| Pressure, psia., | 20 |
| Temperature, °F., | 2550 |
| (60) Feedstock (for N339 Hard Black): | |
| Gallons/hour, | 210 |
| Temperature, °F., | 500 |
| BMCI, | 124 |
| (70) Reactor Effluent (Before Quench): | |
| SCF/hour | 238,000 |
| Pressure, psia., | 16 |
| Temperature, °F., | 2500 |
| Lbs CB/1000 SCF., | 3.42 |

Preferred dimensions for a carbon black reactor as illustrated in the Figures are shown in the following Table.

TABLE II

| | |
|---|---|
| Diameter for Tunnel 20, inches | 10 |
| Diameter for Tube 10, inches | 6 |
| Diameter of Zone 25, inches | 30 |
| Length of Zone 25, inches | 12 |
| Venturi 22 | |
| Entry Diameter, inches | 12 |
| Exit Diameter, inches | 12 |
| Half Converging Angle, degrees | 15 |
| Half Diverging Angle, degrees | 15 |
| Throat Diameter, inches | 8 |
| Length, inches | 15 |
| Diameter of Tunnel 30, inches | 12 |
| Length of Tunnel 30 from Venturi Exit to Central Line of Zone 50, inches | 25 |
| Diameter of Tunnel 40, inches | 6 |
| Diameter of Zone 50, inches | 50 |
| Length of Zone 50, inches | 12 |
| Venturi 72 | |
| Entry Diameter, inches | 15 |
| Exit diameter, inches | 15 |
| Half Converging Angle, degrees | 15 |

TABLE II-continued

| | |
|---|---|
| Half Diverging Angle, degrees | 8 |
| Throat Diameter, inches | 10 |
| Length, inches | 27 |
| Diameter at Tunnel 70, inches | 15 |
| Diameter of Conduit 60, inches | 3 |

That which is claimed is:

1. A process for producing carbon black comprising:
   (a) combusting a fuel gas stream comprising at least 5 percent by volume of at least one of molecular hydrogen and carbon monoxide with an oxidant stream of molecular oxygen-containing gas to provide a combustion product stream then;
   (b) combining each standard part by volume of the combustion product stream with at least 0.1 standard parts by volume of a cooler diluent gas stream selected from air and reactor off-gas to provide a tempered combustion product stream having a temperature lower than the temperature of the combustion product stream and sufficiently high to decompose a carbonaceous feedstock and form carbon black; and then
   (c) injecting a carbonaceous feedstock into the tempered combustion product stream to form carbon black; and
   (d) collecting the carbon black thus produced.

2. A process as in claim 1 wherein the fuel gas stream has a heating value in the range of from about 40 to about 120 BTU/SCF.

3. A process as in claim 2 wherein the fuel gas stream is recovered from the gaseous effluent of a carbon black reactor.

4. A process as in claim 3 wherein the oxidant stream is combined with the fuel gas stream in an amount within 20 percent of the stoichiometric amount to combust the fuel gas stream.

5. A process as in claim 1 wherein the fuel gas stream is introduced generally axially into a first generally cylindrical zone and the oxidant stream is introduced generally tangentially into the first generally cylindrical zone, wherein the combustion product stream is introduced generally tangentially into a second generally cylindrical zone, and wherein the diluent gas stream is introduced generally tangentially into the second generally cylindrical zone.

6. A process as in claim 5 wherein the fuel gas stream is at a temperature within the range of 400°–1200° F., the oxidant gas stream is at a temperature within the range of 400°–1200° F., the combustion gas stream is at a temperature within the range of 2500°–3400° F., and the tempered combustion product stream is at a temperature lower than the combustion product stream and within the range of 2300°–3100° F.

7. A process as in claim 6 wherein each standard part by volume of the combustion product stream is combined with from about 0.2–0.8 standard parts by volume of the diluent gas stream.

8. A process as in claim 7 wherein each standard part by volume of the combustion product stream is combined with 0.3–0.7 standard parts by volume of the diluent gas stream.

* * * * *